O. S. PULLIAM.
VARIABLE SPEED POWER TRANSMISSION.
APPLICATION FILED AUG. 7, 1919.

1,388,303.

Patented Aug. 23, 1921.

WITNESSES

INVENTOR
O. S. Pulliam,
BY
ATTORNEYS

UNITED STATES PATENT OFFICE.

OSWALD S. PULLIAM, OF NEW YORK, N. Y.

VARIABLE-SPEED POWER-TRANSMISSION.

1,388,303.   Specification of Letters Patent.   Patented Aug. 23, 1921.

Application filed August 7, 1919. Serial No. 315,918.

*To all whom it may concern:*

Be it known that I, OSWALD S. PULLIAM, a citizen of the United States, and a resident of the city of New York, borough of Manhattan, in the county and State of New York, have invented a new and Improved Variable - Speed Power - Transmission, of which the following is a full, clear, and exact description.

The present invention relates to new and useful improvements in power transmission devices, and it pertains more particularly to a driving mechanism adapted for use in self-propelled vehicles.

The primary object of the present invention is to provide means by which the differential mechanism so commonly employed may be eliminated.

A further object of the invention is to provide a device which will not only replace the differential mechanism heretofore referred to, but is also capable of providing for a change of driving speeds, thus eliminating the necessity of the transmission mechanism usually employed in motor vehicles.

A still further object of the invention is to so construct a device of this character that a wide range of speeds may be obtained.

With the above and other objects in view, reference is had to the accompanying drawings in which—

Figure 1:
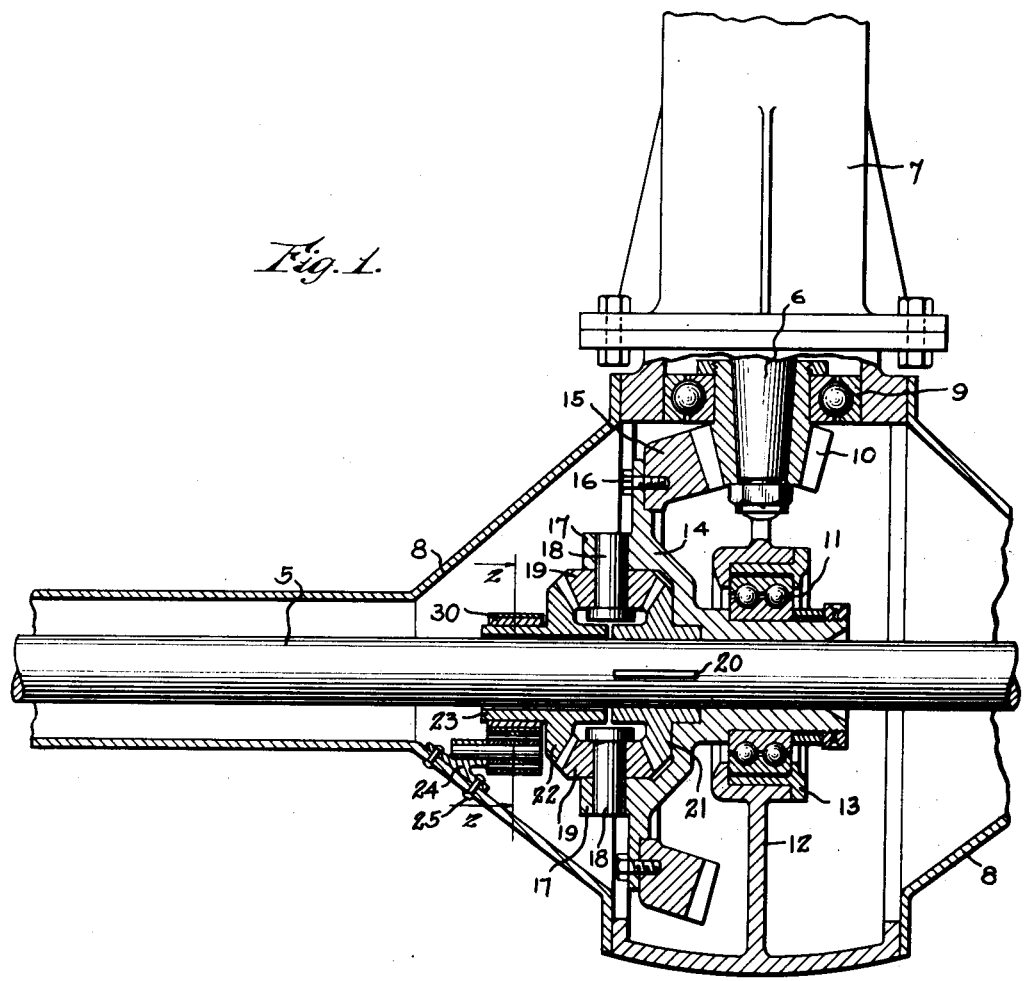
Figure 1 is a horizontal sectional view of the mechanism constructed in accordance with the present invention.
Figure 2:
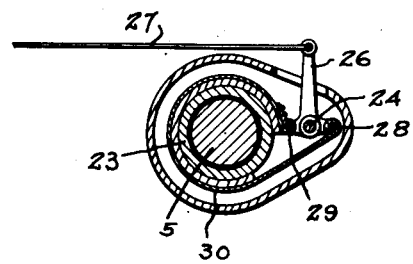
Fig. 2 is a sectional view on the line 2—2 of Fig. 1.

Referring more particularly to the drawings, the reference character 5 designates the rear axle of a self-propelled vehicle, upon the opposite ends of which are mounted the rear traction wheels, which in the present instance have not been shown. The reference character 6 designates the power shaft, and 7 designates its housing, the housing for the rear axle 5 being designated by the reference character 8. The rear axle casing 8 carries a suitable anti-friction bearing 9, in which the rear end of the propeller shaft 6 is mounted for rotation, and carried by the rear end of said propeller shaft 6 and rotatable therewith is a bevel gear or pinion 10. The reference character 11 designates a suitable anti-friction bearing, which is supported by means of a web 12, in a housing 13, which latter is supported in any suitable manner by the axle housing 8. Suitably rotated within said anti-friction bearing 11 and about the shaft 5, is a gear wheel 14, said gear wheel being provided with annular removable teeth 15, which latter are secured in place by bolts 16. The gear wheel 14 is provided with a plurality of oppositely-disposed lugs 17, of which there are preferably four, arranged at equi-distantly spaced intervals about the face of the wheel 14. Mounted in each one of these lugs 17, is a stub shaft 18, and rotatably mounted on each of said stub shafts 18, is a bevel gear or pinion 19.

Keyed to the axle 5, as at 20, is a bevel gear or pinion 21, and said bevel gear or pinion 21, is adapted to mesh with the bevel gears or pinions 19, as shown in Fig. 1. Loosely mounted on the axle 5, is a bevel gear 22, which is adapted to engage the small bevel gears or pinions at points diametrically opposite their points of engagement with the bevel gear 21, and said bevel gear 22 is provided with a hub extension 23.

The reference character 24 designates a bracket rigidly secured by means of rivets or the like 25, to the inner face of one of the housings 8, and pivotally mounted on said bracket of an operating arm or lever 26, to one end of which is attached a suitable operating mechanism 27, which in the present instance is in the form of a rigid rod adapted to project forwardly of the machine in proximity to the driver's seat. Pivotally secured, as at 28, at one end, and at 29 at its opposite end, to the lever 26, is a flexible band 30, and said flexible band 30 is adapted to pass around the hub extension 23 of the bevel gear or pinion 22.

By this construction, it will be seen that upon operation of the lever 26 through the medium of its operating mechanism 27, the flexible band 30 may be caused to grip the hub extension 23 of the bevel gear or pinion 22, to retard the same in its movement about the axle 5.

The operation of the device is as follows:

Power is communicated to the gear wheel 14 by means of the propeller shaft 6, and the annular teeth 15. If the flexible band 30 be slack about the hub extension 23 of the bevel gear or pinion 22, it will be seen that the resistance offered by the traction wheels will permit of the gear wheel 14 turning freely about the axle 5, with the gear 21 remaining stationary and serving as a circular rack about which the bevel gears or pinions 19 travel, it being understood that the bevel gear or pinion 22, it will be seen axle 5.

If now pressure be exerted to tighten the flexible band 30, it will be seen that as soon as said pressure is sufficient to overcome the resistance offered by the contact of the traction wheels with the ground, the bevel gear or pinion 22 serves as a circular rack about which the gear wheel 14 and the bevel gears or pinions 19 rotate, thus communicating power to the bevel gear or pinion 21, which owing to its being keyed to the axle 5, sets up a rotation thereof to drive the car.

It is to be understood that while the bevel gear or pinion 22 is retarded in its rotation about the axle 5, the maximum power is not delivered to the said axle until sufficient pressure is exerted on the flexible band 30 to actually prevent any rotation of the bevel gear or pinion 22. However, if said bevel gear or pinion 22 is permitted to rotate about the axle 5, a wide range of speeds is possible, said speeds being obtained between the points at which the resistance of the vehicle is overcome by the pressure exerted on the hub extension of the gear or pinion 22, and the absolute stopping of said bevel gear or pinion. By the foregoing construction, it will be seen that the present invention provides means by which great flexibility of power can be obtained, and, at the same time, the device has all of the virtues of a differential mechanism.

Further, the present invention permits of the use of a continuous rigid rear axle instead of a sectional axle as commonly employed, thus greatly increasing the strength and durability of motor vehicle rear constructions.

While in the present instance the gear wheel 14 is shown as loosely mounted on the axle 5, it will be readily apparent that suitable clutch devices may be employed for connecting said gear wheel 14 to the axle in order that the drive will be direct from the propeller shaft 6 through the gear 10 and 14 to the axle 5.

Having thus described my invention, I claim as new and desire to secure by Letters Patent:

A device of the character described comprising a driving shaft and a driven shaft, a bevel gear loosely mounted on the driven shaft, a bevel gear carried by the driving shaft and meshing with the bevel gear on the driven shaft, a second bevel gear loosely mounted on the driven shaft, said last-mentioned bevel gear having a hub extension, a bevel gear keyed to the driven shaft and interposed with respect to the two loosely mounted bevel gears on the driven shaft, a plurality of idle gears carried by the first-mentioned loosely mounted gear on the driven shaft and engaging the second-mentioned loosely mounted gear on the driven shaft and the bevel gear keyed to the driven shaft, and a friction brake engaging the hub extension of the last-mentioned loosely mounted gear for retarding the movement thereof and through the medium of the first-mentioned loosely mounted gear on the driven shaft and the idle gears carried thereby serving to transmit power from the driving shaft to the driven shaft through the bevel gear keyed thereto.

OSWALD S. PULLIAM.